(12) United States Patent
Bonsignore

(10) Patent No.: US 8,445,041 B1
(45) Date of Patent: May 21, 2013

(54) DEHYDRATED CASTOR OIL AS AN ANIMAL FEED SUPPLEMENT

(75) Inventor: Patrick V. Bonsignore, Channahon, IL (US)

(73) Assignee: NPD Investments, Inc., Wilmington, DE (US)

( * ) Notice: Subject to any disclaimer, the term of this patent is extended or adjusted under 35 U.S.C. 154(b) by 0 days.

(21) Appl. No.: 13/462,940

(22) Filed: May 3, 2012

(51) Int. Cl.
*A23K 1/18* (2006.01)
*A23K 1/00* (2006.01)
*A23C 15/14* (2006.01)
*A61K 31/20* (2006.01)
*A61F 2/00* (2006.01)
*C07B 35/08* (2006.01)

(52) U.S. Cl.
USPC ........... 426/2; 426/623; 426/417; 426/807; 554/126; 424/442; 514/560

(58) Field of Classification Search
USPC ...................................... 426/2, 601
See application file for complete search history.

(56) References Cited

U.S. PATENT DOCUMENTS

2002/0147356 A1* 10/2002 Bonsignore et al. .......... 554/121

OTHER PUBLICATIONS

Sun Jin et al., "A comparison of the Effects of Dietary Conjugated Linoleic Acid Contents, Cholesterol, Lipid Oxidation and Drip Loss in Pork Loin and Chicken Breast". Journal of Muscle Foods., 18(3) 264-275, (Jul. 2007).*
Pork Fat and Iodine Value FAQs. Available online at www.akey.com on Dec. 2010.*

* cited by examiner

*Primary Examiner* — Rena Dye
*Assistant Examiner* — Assaf Zilbering
(74) *Attorney, Agent, or Firm* — Hunton & Williams LLP

(57) ABSTRACT

The present invention relates to a method for improving the fat firmness and meat quality of a meat animal and/or altering the ratio of saturated fatty acids to unsaturated fatty acids in meat by administering to a meat animal (e.g., pig) a composition comprising an amount of dehydrated castor oil that is effective to improve the quality indices of the animal's meat.

20 Claims, No Drawings

DEHYDRATED CASTOR OIL AS AN ANIMAL FEED SUPPLEMENT

FIELD OF INVENTION

The present invention relates to the field of animal nutrition. Specifically, embodiments of the present invention relate to compositions comprising dehydrated castor oil as an animal feed supplement in an amount effective to improve the quality indices of a meat animal's (e.g., pigs) meat.

BACKGROUND OF THE INVENTION

Conjugated linoleic acid (CLA), as a free fatty acid, has been studied extensively as a probiotic feed supplement for pigs, chickens, and other animals. See, e.g., Gavino et al., *J. Nutr* 130: 27-29 (2000), which is incorporated by reference. CLA is a product with health and nutritional benefits. For example, CLA is known to reduce body fat by a number of potential mechanisms, including by enhancing insulin sensitivity so that fatty acids and glucose can pass through muscle cell membranes and away from fat tissue. See, e.g., U.S. Pat. No. 6,608,222, the entire disclosure of which is incorporated by reference as if fully set forth herein. Other benefits of CLA include the stimulation of muscle growth and fat burning in animals thereby yielding leaner, more desirable (e.g., premium) animals; antioxidant properties; an ability to increase feed efficiency in animals; an ability to increase the mineral content in the bone of animals; and an ability to decrease the amount of cholesterol in the blood of animals. Id. But at the present time, CLA, in its free fatty acid form is potentially a relatively high cost approach to improve the quality indices of a meat animal's (e.g., pigs) meat. By contrast dehydrated castor oil (DCO), a commercially available product used as a low-cost and semi-fast-drying oil in the paint industry, is seen as a potentially cost effective way to introduce CLA into an animal's feed, albeit in the triglyceride form. DCO contains 25-30% conjugated linoleic acid triglyceride ester (CLA-TG) and 65-70% "normal" linoleic acid triglyceride ester (LA-TG) (i.e., not conjugated).

Though DCO has been contemplated as a feed additive for animals generally, its use for specifically improving the fat firmness and meat quality of a meat animal, particularly pigs in the finishing phase, by increasing the quality indices (e.g., iodine value) of the animal's meat has not been exploited. In addition, DCO's use to alter the ratio of saturated fatty acids to unsaturated fatty acids in meat has not been exploited.

SUMMARY OF THE INVENTION

The inventor has surprisingly and unexpectedly discovered that when DCO is administered as an additive to an animal feed, one or more of the quality indices of the animal's meat are improved. For example, for pigs in the finishing phase, the inventor has surprisingly and unexpectedly discovered that when the pigs receive an animal feed composition containing an amount of dehydrated castor oil, at least one of the quality indices of the pig's meat, namely, the iodine value of the meat, is improved. In the case of such pigs, the significantly lowered iodine value heralds a significantly improved fat firmness in the meat, which, in turn, leads to improved slicing and processing of the resulting meat.

In one embodiment, therefore, the invention relates to a method for improving one or more of the quality indices of a meat animal's meat comprising administering to the meat animal a composition comprising an amount of dehydrated castor oil that is effective to improve one or more of the quality indices of the meat animal's meat.

In another embodiment, the invention relates to a method for improving one or more of the quality indices of a meat animal's meat comprising administering to the meat animal a composition comprising at least 20% distiller's dried grain with solubles (DDGS) and an amount of dehydrated castor oil that is effective to improve one or more of the quality indices of the meat animal's meat, which, without the added DCO in the DDGS adjusted feed, ordinarily is found to be adversely affected.

In another embodiment, the invention relates to a method for altering the ratio of saturated fatty acids to unsaturated fatty acids in meat, the method comprising administering to a meat animal dehydrated castor oil in an amount effective to alter the ratio of saturated fatty acid to unsaturated fatty acid in the meat.

DETAILED DESCRIPTION OF THE INVENTION

In one embodiment, the invention relates to a method for improving one or more of the quality indices of a meat animal's meat. The method comprises administering to the meat animal a composition comprising an amount of dehydrated castor oil (DCO) that is effective to improve one or more of the quality indices of the meat animal's meat. In some embodiments, the composition comprises at least 20% DDGS, in addition to the DCO.

As used herein, the term "meat animal" includes, but is not limited to pigs, but also includes cows, turkeys, and chickens.

As used herein, the term "quality index" or "quality indices" refers to, but is not limited to, the iodine value (e.g., the carcass iodine value) of the animal's meat; belly firmness; loin eye area (LEA); percent drip loss; last rib fat thickness; $10^{th}$ rib fat depth; fat free lean; and ratio of saturated fatty acid to unsaturated fatty acid.

As used herein, the term "improving" in the context of the one or more of the quality indices of a meat animal's meat means that, e.g., the iodine value is decreased by at least 5% (e.g., a 5-10% decrease; a 5-15% decreases; or a 10-15% decrease), relative to the iodine value for the meat of animals not receiving DCO (e.g., the control). Thus, for example, if the iodine value for the meat of a meat animal that is not receiving DCO is 76, and there is at least a 14.5% reduction in the iodine value, the iodine value for the meat of animal's receiving DCO would be 65 or less. Or, for example, if the iodine value for the meat of a meat animal that is not receiving DCO is 73, and there is at least a 10% reduction in the iodine value, the iodine value for the meat of animal's receiving DCO would be 65.7 or less.

In some embodiments the iodine value is decreased by at least 7% (e.g., a 7-10% decrease; a 7-15% decreases; or a 10-15% decrease), relative to the iodine value for the meat of animals receiving CLA instead of DCO. Thus, for example, if the iodine value for the meat of a meat animal that is receiving CLA is 70, and there is at least a 7% decrease in the iodine value, the iodine value for the meat of animals receiving DCO would be 65.1 or less.

In the context of belly firmness, LEA, percent drip loss, and fat free lean, the term "improving" refers to an improvement of at least 5% (e.g., a 5-10% improvement; a 5-15% improvement; or a 10-15% improvement) relative to the belly firmness, LEA, percent drip loss or fat free lean for animals not receiving DCO.

Finally, in the context of last rib fat thickness and $10^{th}$ rib fat depth, the term "improving refers to an improvement of at least 15% (e.g., a 15-25% improvement; a 15-20% improvement; or a 20-25% improvement) relative to the last rib fat thickness or $10^{th}$ rib fat depth for animals not receiving DCO.

In addition to improving one or more of the quality indices of a meat animal's meat, DCO may enhance any beneficial effects to, e.g., humans consuming such meat, such that the consumption of the meat of an animal whose feed has been supplemented with DCO may have anti-diabetic, anti-carcinogenic, and/or anti-atherosclerotic effects on those humans. Similar anti-diabetic, anti-carcinogenic, and/or anti-atherosclerotic effects may be experienced by the meat animals receiving DCO. In addition, DCO may have immuno-enhancing activity in the animal consuming feed that has been supplemented with DCO, thus obviating the need for the use of expensive animal vaccines in the animals consuming such feed.

The amount of dehydrated castor oil that is effective to improve the quality indices of the animal's meat may vary from animal to animal and can be influenced by a number of factors, including cost effectiveness, the composition of the fat in the diet (i.e., saturated versus unsaturated fat), the source of the fat in the diet, the total amount of fat in the diet, fat content in diet, and performance feed efficiency gains (e.g., growth rate and feed to gain ratio). In some embodiments, the amount of dehydrated castor oil that is effective to improve the quality index of the animal's meat can be calculated in terms of the weight-by-weight (w/w) ratio of dehydrated castor oil used to food composition utilized in an animal feed diet. One exemplary w/w ratio of dehydrated castor oil to food composition is from 1:200, e.g., 2:100, 2:200; 2:50; and 1:100. In other embodiments, the amount of dehydrated castor oil that is effective to improve the quality index of the animal's meat is up to 5% w/w, e.g., up to 4% w/w, up to 3% w/w, up to 2% w/w, up to 1% w/w, and 0.5% w/w, of the food composition that is fed to the animal. In some embodiments, the amount of dehydrated castor oil that is effective to improve the quality index of the animal's meat is higher than 5% w/w, e.g., 10% w/w, 15% w/w, 20% w/w, 25% w/w or greater. In any event, the amount of DCO should be the amount sufficient to improve one or more of the quality indices of a meat animal's meat. In addition, as those of skill in the art may appreciate, a point may be reached where added DCO only marginally (if at all) improves one or more of the quality indices of a meat animal's meat.

Exemplary food compositions to which the DCO is added include quantities of corn and soybean meal. Other suitable cereal grains that may be included in food compositions for feeding to meat animals include wheat, sorghum, oat, canola, and barley. A complete meat animal diet provides all the nutritional needs of the meat animal in one diet. These diets may be prepared, for example, by mixing a balanced supplement with corn, soybean meal, and a vitamin-mineral premix with corn. Conventional feeds are often supplemented with one or more sources of supplemental fat derived from plant seed oils (extracted), grease and tallow, commercial dry fat, corn oil, soybean oil or full fatted cooked soybeans. Increased oil from the use of the present feed (employing maize grain containing elevated oil and low phytic acid) increases the caloric density of the diet bioavailability of metals and reduces undesired waste.

In some embodiments, the food compositions to which the DCO is added include at least 20% DDGS (e.g., 20-50% DDGS; 20-40% DDGS; 20-30% DDGS; or 20-25% DDGS). In some embodiments, the food compositions to which DCO is added and that include the at least 20% DDGS are fed to the meat animal throughout the animal's life span, up to and including slaughter. In some embodiments, the DDGS is discontinued (i.e., is removed from the animal's diet) at least one week before slaughter, e.g., two weeks before slaughter, three weeks before slaughter or four weeks before slaughter.

In some cases, food compositions may be supplemented with amino acids including lysine, threonine, and tryptophan. To the extent that the food compositions do not carry all of the necessary amino acids in an amount sufficient to put the diet in balance, they must be added to the diet.

An exemplary food composition, particularly for pigs, may include limestone, dicalcium phosphate, milo, animal fat, alfalfa, barley, blood meal, yellow corn, corn gluten, cottonseed meal, DDGS, fish meal, lysine hydrochloride, limestone, milo, molasses, oats, skimmed milk (e.g., dried), soybean meal, soybeans (e.g., fat cooked), soybean oil, sunflower, wheat, and whey. Other components that may be included into a pig's standard food composition includes vitamins (e.g., vitamin A, D, E, and B12), enzymes (e.g., phytase), salt, tylosin phosphate (e.g., Tylan® 40), and minerals (e.g., selenium, an element that has beneficial effects in animal diets). These examples, as others herein, are illustrative of the use of the present invention and are not intended to limit the scope of the disclosed invention.

The amount of food composition that would be given to a meat animal on a day-to-day basis would be about 6-12 pounds, and may need to be changed if it is breeding season; if there is lactation involved; or if there is a deviation from "standard production conditions." See, e.g., Iowa State University, Life Cycle Swine Nutrition at http://www.ipic.iastate.edu/LCSN/LCSNutrition.pdf; and Swine Nutrition (Austin J. Lewis and L. Lee Southern eds., CRC Press LLC 2001), both of which are incorporated by reference as if fully set forth herein. In this context therefore, the amount of DCO added to the feed, on a day-to-day, in some embodiments, is up to 5% w/w of the total weight of the feed. Thus, for example, if 100 pounds of feed is prepared, about up to 5 pounds of the feed would be DCO. Accordingly, in some embodiments, if 100 pounds of feed are contemplated, for example, the amount of DCO in those 100 pounds of feed is from 0.5 pounds up to about 5 pounds, e.g., from about 1 pound to about 5 pounds, from about 2 pounds to about 5 pounds or from about 0.5 pounds to 4 pounds. As stated previously, however, the amount of DCO may exceed 5 pounds. Accordingly, in some embodiments, if 100 pounds of feed are contemplated, for example, the amount of DCO in those 100 pounds of feed is 10 pounds, 15 pounds, 20 pounds, 25 pounds or greater. In any event, the amount of DCO should be the amount sufficient to improve one or more of the quality indices of a meat animal's meat. In addition, as those of skill in the art may appreciate, a point may be reached where added DCO only marginally (if at all) improves one or more of the quality indices of a meat animal's meat.

It is also possible to feed meat animals other food compositions in conjunction with or separately from the solid food compositions, e.g., as a liquid directly fed or as a solution or an emulsion in water. However, in such cases it is preferable that the amount of DCO fed be correlated with the amount of solid food compositions. In embodiments where the an emulsion in water is used, the emulsions contain 25-40% v/v DCO/water, e.g., 25-35% v/v, 25-32% v/v, 35-40% v/v, and 32-40% v/v DCO/water.

Alternatively, DCO may be incorporated into the diet of the meat animal in gel or powdered forms comprising suitable carriers such as starch, sucrose or lactose, proteins, free fatty acids, and other triglycerides. When in tablet or capsule form, the tablet or capsule may be coated with an enteric coating such as those known in the art (e.g., cellulose acetate phthalate).

The DCO used in the embodiments of the present invention contains one or more unsaturated, conjugated fatty acids including 9,11-octadecadienoic acids and/or 10,12-octadecadienoic acids and active isomers thereof. The fatty acids are preferably substantially in the triglyceride ester form. In other words, the fatty acids are in the form of an ester of, e.g., a conjugated linoleic acid, with a glycerol molecule. When the glycerol comprises less than three fatty acids (i.e., when it is a mono- or diglyceride compound), the free hydroxyl groups can remain as a free alcohol or can be modified in ways known in the art, for example, by cross-esterification with a $C_{2-20}$ (e.g., a $C_{2-18}$, $C_{2-14}$, $C_{2-12}$, $C_{2-10}$, $C_{2-8}$, $C_{2-6}$, $C_{2-4}$, or $C_{2-3}$) saturated or unsaturated alkanoic acid or by phosphorylation.

In some embodiments, the DCO comprises between about 25-30% conjugated linoleic acid triglyceride ester (CLA-TG). Of the about 25-30% CLA-TG, about one quarter of the triglycerides contain the cis-9 (9c), trans-11 (11t) and the trans-10 (10t), cis-12 (12c) isomers of the CLA, where the 9c,11t isomer is the major geometric isomer in about a 5:1 ratio relative to the 10t, 12c isomer. Exemplary, commercially available DCO that can be used in the embodiments of the present invention includes Castung® 103G-H dehydrated castor oils from Vertellus Performance Materials Inc., Greensboro, N.C.; and DCO ASTM D 961 from Alnor Oil, Valley Stream NY. These two oils contain about the same amount of total CLA-TG (24.3% and 23.6%, respectively); about the same amount of 9c, 11t isomer (5.4% and 6.4%, respectively); and about the same amount of 10t, 12c isomer (0.6% and 0.5%, respectively).

It should be appreciated that the "catalogued" isomer content of DCO obtained from commercial sources, such as the ones listed above, may not include analytical data (e.g., percent by weight content) of all the possible positional- and stereochemical isomers of the dienoic fatty acid triglycerides present, since only those attributed to having beneficial attributes (e.g., 9c, 11t and 10t, 12c isomers) in animal food science are traditionally analyzed. Further, there is a good probability that a synergism may be operative between an unknown combination of dienoic fatty acid triglycerides present in DCO.

The DCO used in the embodiments of the present invention is dehydrated such that it contains one or more unsaturated, conjugated fatty acids. In some embodiments, however, the DCO can be partially dehydrated. A non-limiting example of a partially dehydrated castor oil is Vertellus' XXX-1 partially dehydrated castor oil, Vertellus Performance Materials Inc., Greensboro, N.C.

In some embodiments, the DCO-containing food compositions of the present invention further comprise L-carnitine, or a salt thereof, including L-carnitine-L-tartrate, L-carnitine magnesium citrate, and acetyl-L-carnitine. In some embodiments, the DCO-L-carnitine combination used in animal food compositions acts synergistically to, e.g., may increase efficiency of feed conversion into lean body weight, further increase fat firmness, and further improve the meat quality in animals, relative to when each component is used separately. In other embodiments, the DCO-L-carnitine combination used in animal food compositions increases the effectiveness of the uptake of DCO and/or CLA comprised in the DCO into animal meat.

In some embodiments, the DCO-containing food compositions of the present invention further comprise betaine, or a salt or derivative thereof; or ractopamine, or a salt or derivative thereof; or mixtures of betaine, or a salt or derivative thereof, and ractopamine, or a salt or derivative thereof. In still other embodiments, the DCO-containing food compositions of the present invention further comprise a mixture of L-carnitine, or a salt thereof; betaine, or a salt or derivative thereof; and ractopamine, or a salt or derivative thereof.

The DCO-containing food compositions of the present invention, whether administered alone or in combination with other components (e.g., L-carnitine and DDGS), generally increase the quality indices of an animal's meat. Quality indices of an animal's meat include, but are not limited to, the iodine value (e.g., the carcass iodine value) of the animal's meat; belly firmness; loin eye area (LEA); percent drip loss; last rib fat thickness; $10^{th}$ rib fat depth; and fat free lean. The iodine value is reported to be indicative of the level of unsaturation in the fats comprised in the animal's meat. That is, the lower the iodine value, the lower the level of unsaturation. The level of unsaturation, in turn, correlates to the firmness of the fat in the animal's meat. More saturation leads to higher fat firmness, which, in turn, leads to improved slicing and processing of the resulting meat.

Relative to other animal food composition additives like CLA, DCO leads to an unexpected and surprising lowering of the meat animal's carcass iodine value, which, in turn, produces leaner, premium meat animals. In some embodiments, the administration of DCO to animal food compositions lead to iodine values of less than 70 and as low as about 65. Ideally, but not necessarily, the improvement of a particular quality index, such as the lowering of the carcass iodine value, may or may not substantially affect one or more other quality indices including, for example, drip loss, meat pH; and/or one or more other performance indices, including loin eye color, loin eye size, feed intake, average daily gain or body weight. In any event, the improvement of one quality index should not negatively affect another quality index. Likewise, the improvement of one performance index should not negatively affect another performance index. Finally, the improvement of one quality index should not negatively affect a performance index and vice versa.

In some embodiments, the methods of the present invention relate to a method for altering the ratio of saturated fatty acids to unsaturated fatty acids in meat. Such methods comprise administering to a meat animal dehydrated castor oil in an amount effective to alter the ratio of saturated fatty acid to unsaturated fatty acid in the meat. In some embodiments, the ratio of saturated fatty acids to unsaturated fatty acids in meat are altered in such a way that the fat firmness and meat quality of a meat animal (e.g., pigs in the finishing phase), is increased (i.e., the absolute value of the ratio increases). The alteration of the ratio of saturated fatty acids to unsaturated fatty acids in the meat would be expected to reflect a decreased iodine value of the animal's meat, thereby leading to firmer fat and higher meat quality. In some embodiments, the ratio of saturated to unsaturated fatty acids in the meat is greater than 0.35, e.g., greater than 0.37. In other embodiments, the ratio of saturated to unsaturated fatty acids in the meat is at least 0.4.

Having now generally described the invention, the same will be more readily understood by reference to the following examples, which are provided by way of illustration and are not intended as limiting. It is understood that various modifications and changes can be made to the herein disclosed exemplary embodiments without departing from the spirit and scope of the invention.

Example 1

A study was conducted to investigate the ability of DCO to increase growth performance and repartition nutrients in the latter phases of pig finishing programs. Thirty-five barrows of a unified genetic background were secured from a local multiplier herd and were allowed to acclimate for two weeks on a standard growing diet. After acclimation, pigs were randomly assigned to control, 0.5% DCO or 1.0% DCO diets. Pigs were allowed ad libitum access to feed and water during the trial. Each week, animals were weighed and feed intake was recorded. At the end of the six-week feeding period, animals were slaughtered and carcass composition and meat quality parameters were evaluated. Ending weight was not different among treatments. Average daily gain was suppressed (P<0.05) by addition of DCO to the diet. Feed consumption, and ultimately, feed efficiency was not different over all treatments, however. Addition of DCO to the diet substantially reduced the fat content of the carcass as measured at both the last (P<0.008) and 10th (P<0.05) ribs. Loin muscle areas of pigs fed DCO were not affected. Carcass lean (%) improved significantly (P<0.04) by the addition of DCO to diets. These data show that addition of DCO to late finishing diets suppresses average daily gain, but improves carcass leanness.

Design of Experiment

Pigs (n=30) were randomly assigned to individual pens and given ad libitum access to a standard diet for a 10-day period in order acclimate. At the end of the 10-day period, pigs were sorted by size and then randomly assigned to one of three dietary treatments: a) control; b) 0.5% DCO or c) 1.0% DCO. All diets were formulated to be isocaloric and isonitrogenous. Feed intake and body weight gains were recorded at 3 and 6 weeks (termination or processing time of animals) of feeding.

Composition Measurements

After 24 h at 2° C., standard carcass measurements were collected. Percent carcass fat-free lean was determined according to Orcutt, M. W. et al., Animal Sciences 68: 3987-3997 (1990) as described by NPPC, Procedures to Evaluate Hogs (3d ed. 1991).

Quality Scores

Fresh pork color, firmness and marbling scores at the cut surface of the 10th and 11th rib interface were evaluated at 2° C., 24 h after exsanguination, by a committee of six trained experts. Quality scores were reported according to established guidelines. See National Pork Producers Council (NPPC), Procedures to Evaluate Hogs (3d ed. 1991).

pH Determination

Postmortem pH was obtained at 45 min (pH45) and 24 h (pH24) after exsanguination by an Ingold glass electrode pH probe (M6/DXK/S7-25, Ingold, Mettler, Toledo, Ohio). The probe was inserted 2.5 cm deep into the LM at a point near the 10th rib.

Water Holding Capacity (Drip Loss)

Water-holding capacity was determined on another chop using the drip loss method. See Rasmussen, A. and Stouffer, J. R. New method for determination of drip loss in pork muscles, Poster Proceedings 42$^{nd}$ International Congress of Meat Science and Technology, Norway, 286-287 (1996). Briefly, muscle samples were collected from one of the 2.54 cm chops using a 2.5 cm diameter coring device. Samples were placed into the drip loss tubes so the cut surface of the meat was perpendicular to the long axis of the drip loss tube. Drip loss analysis was evaluated in triplicate from a 7.0 g core sample. After 24 h at 4° C., the drip loss containers plus sample were reweighed. Muscle samples were removed and discarded and containers were reweighed with exudates. Percentage drip loss was calculated and recorded.

Hunter Color

After visual quality assessment, the chop was removed and analyzed for color using a HunterLab Colorimeter (D25 A Optical Sensor, Hunter Associates Laboratory, Reston Va.). Hunter Color "L," "a," and "b" values were determined using illuminant "A" and a 2° standard observer.

Belly Quality

Bellies were fabricated from intact carcasses according to normal processing specifications. Belly thickness was measured at two locations and averaged. Furthermore, fresh bellies were subjected to the "flop" test, which involved suspension of the belly over a bar for a 24 h period and scoring the amount of flop subjectively (1=good, 5=poor) and objectively by assessing the ending distance between the ends of the belly and normalizing it to overall length.

Statistical Analyses

The experimental units (individual pigs within cages) randomized within the animal facility. Feed intake and body weight gains were analyzed by the repeated measure, while carcass quality measurements were assessed by least significant difference. All data were analyzed using the General Linear Models procedure of SAS® (SAS Institute, 2001). Statements of significance were based on (P<0.05) unless otherwise noted.

Results and Discussion

Regardless of dietary treatment, there were no significant differences in body weight (BW), average daily gain (ADG), average daily feed consumption (ADFC) or feed conversion (FC) as shown in Table 1, below.

TABLE 1

Body weight (pounds), average daily gain (pounds per day), average daily feed consumption (pounds) and feed conversion rates of barrows fed either a control, 0.5% DCO or 1.0% DCO supplemented diet.

| Body Weight (p < 0.1454) | | | | |
|---|---|---|---|---|
| Treatment | Baseline | Week 3 | Week 6 | Overall |
| Control | 164.78 ± 5.38 | 211.22 ± 5.38 | 260.89 ± 5.38 | 212.30 ± 3.11 |
| 0.5% DCO | 164.11 ± 5.38 | 201.67 ± 5.38 | 244.89 ± 5.38 | 203.56 ± 3.11 |
| 1.0% DCO | 163.56 ± 5.38 | 207.67 ± 5.38 | 253.94 ± 5.38 | 208.39 ± 3.11 |
| Average Daily Gain (p < 0.679) | | | | |
| Treatment | | Week 3 | Week 6 | Overall |
| Control | | 2.21 ± 0.154 | 2.36 ± 0.154 | 2.28 ± 0.109 |
| 0.5% DCO | | 1.78 ± 0.154 | 2.05 ± 0.154 | 1.92 ± 0.109 |
| 1.0% DCO | | 2.10 ± 0.154 | 2.20 ± 0.154 | 2.15 ± 0.109 |
| Average Daily Feed Consumption (p < 0.2186) | | | | |
| Treatment | | Week 3 | Week 6 | Overall |
| Control | | 6.77 ± 0.264 | 7.90 ± 0.264 | 7.34 ± 0.190 |
| 0.5% DCO | | 6.13 ± 0.264 | 7.60 ± 0.264 | 6.87 ± 0.190 |
| 1.0% DCO | | 6.54 ± 0.264 | 7.67 ± 0.264 | 7.11 ± 0.190 |
| Feed Conversion (p < 0.2184) | | | | |
| Treatment | | | | Overall |
| Control | | | | 3.21 ± 0.180 |
| 0.5% DCO | | | | 3.57 ± 0.180 |
| 1.0% DCO | | | | 3.30 ± 0.180 |

Even through there were no overall significant differences in the parameters mentioned previously, the control group tended to outperform either of the DCO groups, especially the 0.5% DCO treatment group. Furthermore, even though statistical significance was not observed in this study, there was little question that these data would, in fact, be significant when moved into larger production systems. While not being bound by theory, the reduction in ADG is likely due to reduced fee intakes, as shown in Table 1. Even though not significant, there was a trend for the 0.5% DCO group to consume less feed, especially during week 3. The reduced feed consumption may be due to feed palatability. In contrast, pigs fed the higher DCO (1.0%) clearly grew at the same rate as controls and did not consume less feed.

Carcass performance as determined by the dressing percentage (73.56±2.11; 72.94±2.11; or 72.65±2.11) was not different across treatments. Furthermore, dietary treatment did not alter belly firmness, loineye area, subjective measurements of loin quality (color, firmness, and marbling), or 24 pH, as shown in Table 2 below. However, there were significant dietary effects in percent drip loss, last rib fat thickness, 10th rib fat depth, and percent fat free lean, as shown in Table 3 below.

TABLE 2

Belly firmness, loin eye area (LEA), loin quality measurements (L, A, marbling, firmness, and 24-hour pH) in barrows fed either a control, 0.5% DCO or 1.0% DCO supplemented diet.

| Treatment | Belly Firmness* | Adjusted Belly Data** | LEA (in²) | Loin L Value | Loin A Value | Marbling | Firmness | 24-hour pH |
|---|---|---|---|---|---|---|---|---|
| Control | 2.38 ± 0.32 | 0.62 ± 0.13 | 6.08 ± 0.75 | 52.41 ± 1.97 | 11.22 ± 0.86 | 2.31 ± 0.51 | 2.38 ± 0.49 | 5.56 ± 0.03 |
| 0.5% DCO | 2.33 ± 0.32 | 0.67 ± 0.13 | 6.23 ± 0.75 | 53.43 ± 1.97 | 10.39 ± 0.86 | 2.06 ± 0.51 | 2.44 ± 0.49 | 5.52 ± 0.03 |
| 1% DCO | 2.09 ± 0.32 | 0.63 ± 0.13 | 6.47 ± 0.75 | 52.43 ± 1.97 | 10.86 ± 0.86 | 2.35 ± 0.51 | 2.25 ± 0.49 | 5.54 ± 0.03 |
| P value | 0.7580 | 0.7580 | 0.7192 | 0.4942 | 0.1747 | 0.4774 | 0.7198 | 0.855 |

*1 = good, 5 = bad
**Adjusted belly data were determined as the length change (belly length on flat surface) divided by the length when put across a bar at the mid pont. Thus, a score of 1 would be no change.

TABLE 3

Percent drip loss, last rib fat thickness, $10^{th}$ rib fat depth, and percent fat free lean in barrows fed either a control, 0.5% DCO or 1.0% DCO supplemented diet.

| Treatment | Percent drip loss | Last rib fat thickness (in) | $10^{th}$ rib fat depth (in) | Percent fat-free lean |
|---|---|---|---|---|
| Control | 2.41 ± 0.13a | 1.29 ± 0.19a | 0.97 ± 0.20a | 49.53 ± 1.72a |
| 0.5% DCO | 1.67 ± 0.13b | 1.01 ± 0.19b | 0.75 ± 0.20b | 52.41 ± 1.72b |
| 1.0% DCO | 2.18 ± 0.13ab | 1.01 ± 0.19b | 0.75 ± 0.20b | 52.89 ± 1.72b |
| P-value | 0.0374 | 0.0078 | 0.0526 | 0.0383 | a-b Means within a column for differ significantly.

These data suggest that the addition of dietary DCO could improve drip loss of pork. The main reason for reduced water being trapped in the muscle (or improved water-holding capacity, WHC) is related to the integrity of the muscle cell membranes. Addition of greater amount of triglycerides that are more resistant to insults, such as pH and oxidation, would likely improve membrane stability.

The fact that dietary DCO improved carcass leanness may be due to the effect of DCO in inhibiting fat deposition. It may well be that pigs fed DCO were incapable of depositing as much fat as their control counterparts, and thus, greater amounts of nutrients were re-partitioned into muscle. Then, perhaps in a feedback mechanism, the nutrient demand placed on the animal was lowered. Accordingly, lower feed intakes would be needed, thereby reducing ADG. Alternatively, slower growing pigs (fed-restricted) are leaner. Therefore, given that pigs fed DCO tended to consume less feed and muscle deposition has priority over fat deposition, to a point, the leanness observed in this study may have been simply a function of reduced intake.

From a practical standpoint pigs fed DCO simply grew slower because it took time to acclimate to the diet, it may be possible to subject pigs to DCO earlier, perhaps in a grower diet. Then, given that DCO-fed pigs in this study tended to experience some compensatory gain, younger pigs would have a greater time to acclimate "catch-up" to control diets, yet retain an advantage in leanness.

Example 2

The Midwest is experiencing a sharp rise in the number of bioethanol plants. There is therefore a real possibility in alternative feed ingredients emanating from these plants as by products of ethanol production that can be included in livestock diets. One of these byproducts is DDGS. In a trial utilizing 0, 10, 20, and 30% DDGS in grow-finish diets, decreased growth performance in pigs fed 20 or 30% DDGS was noted by Whitney et al. in 2006. Whitney, M. H., et al., *J. Anim. Sci.* 84: 3356-3363 (2006).

In addition to growth performance concerns, many processors question overall carcass quality in DDGS fed animals. Dietary intake plays a major role in determining body composition, specifically fat composition, since pigs can directly deposit dietary fat into their fat depots. This transfer from diet to body fat is well characterized in grow-finish pigs. Saturated fatty acids tend to positively influence fat quality by increasing firmness, when included in the diet. Conversely, monounsaturated fatty acids and polyunsaturated fatty acids all tend to negatively affect fat by causing it to have a softer composition. Carcasses high in unsaturated fat acids are characterized by higher levels of oxidation, slicing and processing difficulties and thus have decreased carcass value. Fat firmness can be estimated by determining the fatty acid profile and calculating the IV. See, e.g., Madsen, A., et al., *Acta Agric. Scand., Sect. A. Animal Sci.* 42: 220-225 (1992). In 1998, the Association of Official Analytical Chemists stated that the IV can be calculated as follows: IV=(% C16:1*0.950)+(% C18:1*0.860)+(% C18:2*1.732)+(% C18:3*2.616)+(% C20:1*0.785)+(% C22:1*0.723). Acceptable IV values vary depending on the processor; however, an IV value over 70 frequently indicates soft fat and a less desirable carcass. See Whitney, M. H., et al., *J. Anim. Sci.* 84: 3356-3363 (2006). Whitney noted that increased IV as the inclusion of DDGS increased and noted an IV above 70 in pigs fed 20 and 30% DDGS when compared to control.

Bacon can be scored according to lean (greater than 50% of the slice width) and slice thickness (wider than 1.9 cm at all points) to identify premium quality slices. If these standards are not met, the slice goes from being a number one slice to being a number two slice and if the slice is far from meeting the standards, it is classified "ends and pieces." Person, R. C., et al., *Meat Science* 70: 121-131 (2005). Each undesirable characteristic or below standard trait represents a decrease in belly value and consequently, a decrease in carcass value.

In this study, thirty gilts from a single source were obtained at approximately 90 kg each. Pigs were equally and randomly assigned to three treatment combinations with ten replicates per treatment and fed different diets 30 days prior to slaughter, the final finishing period. Treatments were as follows: control; CLA; and DCO. Pigs were examined for growth and carcass trait changes as influenced by dietary treatment. In this study, while no changes occurred in drip loss, pH, loin eye color or size, feed intake, average daily gain (ADG), body weight (BW), or any other carcass measurement, surprisingly, supplemented DCO greatly reduced carcass IV. For example, back fat taken from DCO gilts showed a decrease ($P \leq 0.0001$) in iodine value when compared to all other treatments. At the same time, there were increases ($P \leq 0.05$) in known fatty acids (C16:0 and C16:1) which signify greater de novo fat synthesis in DCO treated pigs. Adding DCO to pig diets during the final finishing phase showed lower carcass IV.

The objectives of this experiment were to examine the effect of including CLA versus DCO in diets of grow-finish pigs being in late finishing on growth and fat quality as it relates to the carcass.

Design of Experiment

Thirty gilts were obtained from Purdue University Swine Unit and were individually housed in the Purdue University Animal House Facility. Gilts averaged 86 kg at the start of the thirty day trial and were randomly assigned to one of three treatments and fed as shown in Table 1. All diets met or exceeded the requirements set forth by the National Research Council Nutrient Requirements for Swine and were fed ad libitum. The Purdue Animal Care and Use Committee approved animal housing, handling and sample collection procedures.

TABLE 4

Composition of diets used for control (1), control with a portion substituted with Conjugated linoleic acid (CLA) and the other diet substituted with DCO.

| Ingredient | Control | CLA | DCO |
|---|---|---|---|
| PU Corn 2006 NRC | 64.840% | 64.840% | 64.840% |
| Soybean Meal | 8.310% | 8.310% | 8.310% |
| DDGS - Rens. | 20.000% | 20.000% | 20.000% |
| Restaurant Grease (Animal-Vegetable Blend) | 2.000% | 2.000% | 2.000% |
| Soybean Oil | 2.500% | 1.750% | 0.000% |
| CLA Product (Clarinol ® G-80) | 0.000% | 0.750% | 0.000% |
| DCO (Castung) | 0.000% | 0.000% | 2.500% |
| Limestone | 1.280% | 1.280% | 1.280% |
| Vitamin | 0.125% | 0.125% | 0.125% |
| TM | 0.075% | 0.075% | 0.075% |
| Phytase | 0.080% | 0.080% | 0.080% |
| Salt | 0.300% | 0.300% | 0.300% |
| Lysine-HCL | 0.300% | 0.300% | 0.300% |
| L-Threonine | 0.060% | 0.060% | 0.060% |
| L-Tryptophan | 0.030% | 0.030% | 0.030% |
| Tylan 40 | 0.050% | 0.050% | 0.050% |
| Selenium (Se 600) | 0.050% | 0.050% | 0.050% |
| Total | 100.000% | 100.000% | 100.000% |
| CLA levels | 0.000% | 0.600% | 0.608% |
| Calculated Nutrients | | | |
| Metabolizable Energy, kcal/kg | 3590.9 | 3590.7 | 3590.7 |
| CP, % | 14.580 | 14.599 | 14.599 |
| Fat, % | 9.607 | 9.606 | 9.606 |
| Lys, % | 0.827 | 0.829 | 0.829 |
| Digestible Lys, % | 0.650 | 0.650 | 0.650 |
| Ca, % | 0.553 | 0.553 | 0.553 |
| P, % | 0.365 | 0.365 | 0.365 |
| Est. Avail. P, % | 0.215 | 0.215 | 0.215 |

* Diets included 0.1% Micro Aid ® (*Yucca shidigera* plant extract).
* CLA product contains 80% CLA isomers. DCO product has 24.3% CLA isomers.
* Premix provided per kilogram of complete diet: vitamin A, 3630 IU; vitamin D, 363 IU; vitamin E, 26.4 IU; menadione, (menadione sodium bisulfate complex), 1.2 mg; vitamin B12, 0.2 10 mg; riboflavin, 4.2 mg; d-pantothenic acid, 13.2 mg; and niacin, 19.8 mg.
* Premix provided per kilogram of complete diet: Fe, 84.7 mg; Zn, 84.7 mg; Mn, 10.5 mg; Cu, 7.9 mg; I, 0.3 mg; Se, 0.3 mg.

Individual body weights and feed intakes were recorded every two days during the duration of the experiment and on the day of slaughter. Carcass measurements taken 24 hours after exsanguination included loin eye area; 10th rib back fat depth; last rib back fat depth and color; marbling; and firmness scores. Loin drip loss, belly bend values, and back fat were obtained. Fatty acid concentration was determined on a combined middle and outer layers.

Water Holding Capacity (Drip Loss)

Loin chop water holding capacity was measured by removing a muscle sample with a 2.54 cm coring device from a 1 inch chop of the 10th rib, left carcass side and following the drip loss method. See Rasmussen, A. and J. R. Stouffer, *New Method for Determination of Drip Loss in Pork Muscles*, Poster Proceedings at the 42nd International Congress of Meat Science and Technology in Norway 286-287 (1996). The muscle core sample was placed in a pre-weighed collection tube, combined weight was taken and the tube with meat was stored at 4° C. After 24 hours, tubes were removed, muscle removed and the tube was weighed with only the exudates in order to quantify water loss.

Belly Fat Firmness (Belly Bend Test)

Bellies were removed anterior to the 10th rib and trimmed. The bellies were weighed and thickness at the two 10th rib corners were measured. Bellies were centered on a 1 cm bar and allowed to settle for one minute after which, height from the floor to the corners was recorded. Absolute bend was an average of these resulting values. Percent bend was also calculated (absolute bend/weight of the trimmed belly times 100) as well as relative bend (absolute bend/average thickness of the belly times 100).

Analysis of Fatty Acid Profile

Fat samples (200 mg) were minced and placed in a 10 mL test tube. Two mL of hexane was added to each tube; the samples were vortexed for 1 minute; and heated in an 80° C. water bath for 30 minutes. Next, 0.1 mL of 2 N methanolic KOH was added. The sample was vortexed for two minutes. Samples were centrifuged at 3.840×g for 20 minutes and a 50 µL aliquot was removed from the organic layer and diluted with 0.95 mL of hexane. Samples were then analyzed using a Varian 3900 gas-liquid chromatograph equipped with an 8400 autosampler and WCOT fused silica 30 meter×0.32 mm CP wax 52 CP capillary column (Varian Inc., Palo Alto, Calif.) and helium as a carrier gas. Initial oven temperature of 175° C. was set and held for four minutes followed by an increase of 3° C. per minute until 240° C. was reached and held for thirty minutes. Samples were split injected (1:33) and fatty acid values were presented as area percentages.

Statistics

In this trial, animals were randomly assigned to treatments for a completely randomized design. Treatments were compared using Duncan Multiple range test for treatment procedure of SAS® (SAS Institute, 2001). Statements of significance were based on (P<0.05) unless otherwise noted.

There were no significant differences noted in carcass quality scores (loin color, pH, hot carcass weight, belly bend, driploss/water holding capacity; data not shown), as well as body weight (BW) or average daily gain (ADG) (Table 5).

TABLE 5

Effect of diets (1 = control, 2 = CLA and 3 = DCO) on finishing pig growth performance (pounds).

| Treatments | 1 | 2 | 3 | Prob. P< |
|---|---|---|---|---|
| Body Weight (pounds) | 263.6 | 264.6 | 262.8 | 0.97 |
| ADG (pounds per day) | 2.07 | 2.00 | 1.94 | 0.81 |

| Iodine Values | IV |
|---|---|
| 1 | 73 |
| 2 | 70 |
| 3 | 65 |

The only difference noted in this trial was changes in the fatty acid composition. That is, the fatty acids which are known to be good indicators of de novo synthesis of fat were higher ($P \leq 0.05$) in the DCO treatment compared to the other treatments as evidenced by the level of C16:0 and C16:1 (Table 6).

TABLE 6

Fatty acid profiles (in percent) of combined outer and middle layers on pigs fed the following treatments: 1 = Control, 2 = Control supplemented with CLA and 3 = Control supplemented with DCO during the last 30-days of finishing.

| Fatty Acid | Diets | | |
|---|---|---|---|
| | 1 | 2 | 3 |
| C14:0 | 1.28 | 1.5 | 1.58 |
| C16:0 | 20.7[b] | 20.6[b] | 21.6[a] |
| C16:1 | 1.76[b] | 1.53[c] | 1.99[a] |
| C16:3 | 0.21 | 0.24 | 0.25 |
| C18:0 | 10[c] | 12.87[a] | 11.42[b] |
| C18:1n9 | 36.3 | 32.34 | 34.1 |
| C18:1n7 | 2.45 | 2.29 | 2.42 |
| C18:2n6 | 20.22[a] | 20.21[a] | 17.17[b] |
| C18:2$^{9-11}$ | 0.12[c] | 0.82[b] | 0.97[a] |
| C18:2$^{10-12}$ | 0.007[c] | 0.46[a] | 0.04[b] |
| C18:3n3 | 0.01 | 0.01 | 0.01 |
| C20:1n9 | 0.64 | 0.59 | 0.58 |
| C20:4n6 | 0.08 | 0.09 | 0.09 |
| C20:5n3 | 0.32 | 0.3 | 0.29 |
| IV | 73.2a | 69.2b | 65.08c |

[a-c]Means (± standard error) within a row are significantly different ($P \leq 0.05$).

At the same time, the level of C18:2n6 was lower (P<0.05) in the DCO treatment when compared to the other two treatments (Table 6). The lowest ($P \leq 0.0001$) iodine value (IV) was observed in the DCO treatment, followed by the control supplemented with CLA and the highest level was observed in the Control group (Table 3). While not wishing to be bound by theory, the results obtained from animals receiving DCO supplementation may be a reflection of better de novo synthesis of fat compared to direct incorporation of fatty acids in the diet. As shown in Table 3, the level of palmitic acid, which is the first fatty acid produced during lipogenesis, is higher in the DCO group when compared to the others. C. Mathew and K. E. Van Holde, Biochemistry (Benjamin/Cummings Publication Co. 1990).

The invention described and claimed herein is not to be limited in scope by the specific embodiments herein disclosed, since these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for improving at least one of the quality indices of the meat of a pig that is being raised to produce meat for potential human consumption, wherein said meat quality indices consist of (i) carcass iodine values, (ii) belly or fat firmness and (iii) the ratio of fatty acids to unsaturated fatty acids in the meat, wherein the method is a feeding regimen that includes feeding to the pig a feed composition containing an amount of dehydrated castor oil (DCO), wherein said amount of DCO fed to said pig is effective to improve at least one of said quality indices of the meat of said pig, and further wherein the at least one improved quality indice includes at least an improvement in the carcass iodine value of the meat of said pig such that it is less than 70.

2. The method of claim 1, wherein the pig is further fed L-carnitine.

3. The method of claim 2, wherein the L-carnitine is selected from free L-carnitine, L-carnitine L-tartrate, L-carnitine magnesium citrate and acetyl-L-carnitine.

4. The method of claim 1, wherein the feeding regimen includes a final finishing phase prior to slaughter wherein dehydrated castor oil is fed to the pig at least throughout.

5. The method of claim 1, wherein the dehydrated castor oil is fed to the meat animal throughout the meat animal's life span, up to and including slaughter.

6. The method of claim 1, wherein feeding said dehydrated castor oil to the pig does not substantially change one or more other meat quality indices selected from the group consisting of drip loss, meat pH, loin eye color, loin eye size, feed intake, average daily gain and body weight.

7. The method of claim 1, wherein the carcass iodine value is about 65.

8. The method of claim 1, wherein feeding said dehydrated castor oil to the pig alters the ratio of saturated fatty acids to unsaturated fatty acids in meat.

9. The method of claim 8, wherein the fatty acids comprise C16:0 and C16:1 fatty acids.

10. The method of claim 1, wherein the pig is further fed distillers dried grain with solubles (DDGS).

11. The method of claim 10, wherein the feeding composition comprises at least 20% DDGS.

12. The method of claim 10, wherein the DDGS is fed to the meat animal throughout the meat animal's life span, up to and including slaughter.

13. The method of claim 10, wherein the carcass iodine value is about 65.

14. The method of claim 10, wherein the feeding of DDGS to the pig is discontinued at least one week before slaughter.

15. The method of claim 1, wherein the feed composition containing dehydrated castor oil fed to the pig does not contain any other source of conjugated linoleic acid.

16. The method of claim 1, wherein the pig is fed a feed composition containing up to about 5% w/w of dehydrated castor oil.

17. The method of claim 1, wherein the feed composition contains greater than 5% w/w of dehydrated castor oil.

18. The method of claim 1, wherein the feed composition contains greater than 5% w/w of dehydrated castor oil.

19. The method of claim 1, wherein the feed composition contains about 10% w/w of dehydrated castor oil, about 15% w/w of dehydrated castor oil, or about 25% w/w of dehydrated castor oil.

20. The method of claim 1, wherein the feed composition greater than 25% w/w of dehydrated castor oil.

* * * * *